United States Patent [19]

Lee et al.

[11] Patent Number: 5,835,299
[45] Date of Patent: Nov. 10, 1998

[54] METHOD FOR OPTIMIZING SKEW OF HARD DISK DRIVE

[75] Inventors: Byung-Joon Lee, Suwon; Jae-Sung Lee, Seoul, both of Rep. of Korea

[73] Assignee: SamSung Electronics Co., Ltd., Kyungki-do, Rep. of Korea

[21] Appl. No.: 702,873

[22] Filed: Aug. 26, 1996

[30] Foreign Application Priority Data

Aug. 25, 1995 [KR] Rep. of Korea ............... 26592/1995
Aug. 28, 1995 [KR] Rep. of Korea ............... 26956/1995
Jul. 25, 1996 [KR] Rep. of Korea ............... 30443/1996

[51] Int. Cl.$^6$ ............................................. G11B 5/00
[52] U.S. Cl. ........................ 360/76; 369/54; 369/44.32
[58] Field of Search ........................ 360/76, 75, 77.04, 360/77.06, 77.07, 78.04, 69; 369/47, 54, 53, 58, 103, 44.28, 44.32

[56] References Cited

U.S. PATENT DOCUMENTS

| | | |
|---|---|---|
| 4,097,908 | 6/1978 | Chou et al. . |
| 4,513,331 | 4/1985 | Baker . |
| 4,746,996 | 5/1988 | Furuhata et al. . |
| 4,843,496 | 6/1989 | Marchetti . |
| 5,029,030 | 7/1991 | Luecke . |
| 5,193,036 | 3/1993 | Green et al. . |
| 5,408,367 | 4/1995 | Emo . |
| 5,587,984 | 12/1996 | Owa et al. ......................... 369/103 |
| 5,729,514 | 3/1998 | Horigome et al. ................. 369/58 |

*Primary Examiner*—Muhammad N. Edun
*Attorney, Agent, or Firm*—Robert E. Bushnell, Esq.

[57] ABSTRACT

The skews in a hard disk drive are optimized by a method including the steps of: initializing a measurement position on a disk to obtain a skew value; initializing a skew table; moving a transducer head to a corresponding measurement position; obtaining an optimal value of track skew and cylinder skew; determining whether the current head position is a last measurement position; when the current head position is not the last measurement position, selecting the next measurement position and returning to the head moving step; and when the current head position is the last measurement position, storing the obtained optimal skew value in a predetermined area of said drive or a memory device. As a result, the time for reading and writing information from and to the disk is sharply reduced.

6 Claims, 8 Drawing Sheets

METHOD FOR OPTIMIZING SKEW OF HARD DISK DRIVE

CROSS-REFERENCE TO RELATED APPLICATION

This application makes reference to, incorporates the same herein, and claims all benefits accruing under 35 U.S.C. §119 from an application for *Method For Optimizing Skew Of Hard Disk Drive* respectively filed in the Korean Industrial Property Office on 25 Aug. 1995, 28 Aug. 1995 and 25 Jul. 1996, and there respectively assigned Ser. Nos. 26592/1995, 26956/1995 and 30443/1995.

BACKGROUND OF THE INVENTION

1. Technical Field

The present invention relates to a hard disk drive, and more particularly, to a method for optimizing skew of the hard disk drive in which an optimal skew value suitable for each drive is set to improve performance of the hard disk drive.

2. Background Art

Computers often include auxiliary memory storage units having media on which data can be written and from which data can be read for later use. Hard disk drives incorporating stacked, commonly rotated rigid magnetic disks are used for storage of data in magnetic form on the disk surfaces. Generally, such hard disk drives include a motor drive spindle and associated clamping mechanism for receiving and rotating a disk at a predetermined constant speed, a transducer head positioning assembly for radially positioning a read/write transducer head in response to track position commands, and electronic circuitry for operating the motor, the transducer head positioning mechanism and for providing data to and reading data from the disk. Some disk drives are designed with only one read/write transducer head while others are designed with a plurality of transducer heads for enabling data to be written onto and read from a plurality of corresponding disks.

Data is organized on a disk using a series of concentric, radially spaced data information tracks arranged on the surface of the disk, with each track being divided into a plurality of sectors formatted in a predetermined standard manner. The format specifies the sequence and location of certain types of information such as track number, sector number, data field, etc. Disk recording capacity is also specified as the number of tracks per inch (TPI) and bits per inch (BPI). The actual data is recorded onto a track using conventional magnetic recording techniques for binary data.

In order to reliably store and retrieve data on a disk, the data transducer head must be properly positioned directly over a data track. In addition, as the transducer head is moved from track to track, such movement must be precisely along a radius of the disk and not skewed at an angle to the radius. This precise transducer head positioning is extremely important as the disk drive technology becomes increasingly important and the track capacity, density and miniaturization of hard disk are necessarily maximized to accommodate a high volume of information data. As the disk drives are miniatured and high density disks are obtained, however, assembly errors often arise during the high volume manufacturing of a disk drive. For example, when multiple transducer heads are arranged in a row on a co-axial cylinder of the disk drive, a slight change in such an arrangement will detrimentally affect the reliability or function of the entire disk drive. This prolongs a setting time for a stable head positioning of a target transducer head since a phase error signal (PES) increases after the head switching.

Generally, in the head switching action of the hard disk drive, after the transducer head is switched according to servo information while the transducer head is positioned on a disk surface, whether the position difference of the transducer head is stable is determined. Then, reading and writing is performed after verifying a corresponding sector ID. At this time, the head position is changed to a first sector portion of a disk from a physical index position to perform reading and writing after the stable head setting, which is referred to as a track skew. The time for the head switching to reading and writing from or to a corresponding sector is referred to as a track skew time. For instance, assuming that there are two transducer heads in a hard disk drive, the time from reading and writing with respect to a last sector of a first transducer head to continuous reading and writing with respect to a first sector of a next transducer head is referred to as a track skew time which includes a head switching time, a head settling time and a controller ready time for reading and writing data on the disk.

In addition, the head switching of reading and writing from the last sector and a last transducer head of a N-th track to the first sector and a first transducer head of a (N+1)th track is referred to as a cylinder skew, and the necessary time for such a head switching is a cylinder skew time which includes a head switching time, a head settling time, a 1-track seek time and a controller ready time for reading and writing data on the disk. These skew parameters exhibit different values from each other according to a zone structure for a constant density recording. However, in the conventional hard disk drive, we have observed that a uniform skew value is applied to all disk drives by generally calculating the head switching time, the head settling time, the controller ready time and the 1-track seek time without considering the characteristics of each individual hard disk drive. That is, even though the skew value can be adjusted in accordance with individual components such as a transducer head, a spindle motor, a voice coil motor and a servo system etc. all of which define the characteristics of each hard disk drive, a uniform value with a predetermined allowance, rather than an optimal value for each disk drive, is set as a skew value. As a result, the settling time of the transducer head is prolonged when the transducer head arrangement is slightly changed or deformed and the skew time becomes undesirably lengthened. That is, since the first sector position is determined by the calculated skew time, the direct reading and writing of the first sector is not available at least until after one rotation of a disk. In other words, a single rotation of the disk is required before the first sector position can be determined. This inevitably results in a time delay which lowers the performance of each individual disk drive as well as the entire hard disk drive. Moreover, it is burdensome to repeat a rather complicated process of checking the disk drive characteristics and reset another skew value suitable for each design change of the disk drive.

SUMMARY OF THE INVENTION

Accordingly, it is therefore an object of the present invention to provide a skew optimizing method for a hard disk drive having a rigid multiple magnetic disks.

It is another object to provide a skew optimizing method for a skew optimizing method for a hard disk drive in which an optimal skew value for each disk drive is separately provided to maximize the performance of the disk drive.

These and other objects of the present invention can be achieved by a skew optimizing method for a hard disk drive by initializing a measurement position on a disk to obtain a skew value; initializing a skew table; moving a transducer head to the corresponding measurement position; obtaining an optimal value of track skew and cylinder skew; checking whether the current head position is a last measurement position; when the current head position is not the last measurement position, selecting the next measurement position and returning to move the transducer head to the corresponding next measurement position; and when the current head position is the last measurement position, storing an obtained optimal skew value in a predetermined area of the disk drive or a memory device.

According to a second embodiment of the present invention, a skew optimization of a hard disk drive may be attained by (a) initializing a zone number and a head number by formatting a disk without a track skew; (b) searching for a sector identification while switching transducer heads at current zone and transducer head; (c) calculating the distance between two successive sector identifications during the transducer head switching; (d) calculating and storing a track skew based on the data searched for at step (b) and increasing the head number by a constant value; (e) determining whether the track skew of a last transducer head is calculated; (f) when it is determined that the track skew of the last transducer head is not calculated at step (e), returning to step (b); (g) when it is determined that the track skew of the last transducer head is calculated at step (e), sequentially searching for a sector identification from a particular track of the current zone to a next track, (h) calculating the distance between the successive sector identification of the particular track and the next track during the sequential searching at step (g); (I) calculating and storing a cylinder skew based on the data searched for at step (g); (j) increasing the zone number based on a calculated cylinder skew value and determining whether the cylinder skew of the last zone is calculated; (k) when it is determined that the cylinder skew of the last zone is not calculated at step (j), initializing the head number and returning to step (b); and (l) when it is determined that the cylinder skew of the last zone is calculated at step (j), storing the skew value for each transducer head and zone in a cylinder used for information storage and formatting with the track skew.

According to a third embodiment of the present invention, a skew optimization for a hard disk drive is attained by (a) checking whether a test of all zones and transducer heads of the hard disk drive is completed; (b) when it is determined that the test of step (a) is not completed, setting an initial skew value of a corresponding zone and transducer head; (c) formatting the corresponding zone and transducer head based on the set skew value; (d) measuring a required time to perform reading and writing in a formatted state; (e) determining whether a measured time value is less than a set time value; (f) when it is determined that the measured time value is less than the set time value, recording an optimal skew value of the corresponding zone and transducer head and determining whether the test of all skews in the corresponding zone and transducer head is completed; (g) when it is determined that the measured time value is not less than the set time value, bypassing step (f) and determining whether the test of all the skews in the corresponding zone and transducer head is completed; (h) when the test of all the skews in the corresponding zone and transducer head is not completed, changing the current skew value to a next skew value to be tested and returning to step (c); (I) when the test of all the skews in the corresponding zone and transducer head is completed, setting the zone and transducer head to a position of the next test, and returning to step (a); and (j) when it is determined that the test with respect to all the zones and transducer heads are completed in step (a), storing the skew value of a minimum required time in each zone and transducer head as an optimal skew value in a predetermined area of a disk.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
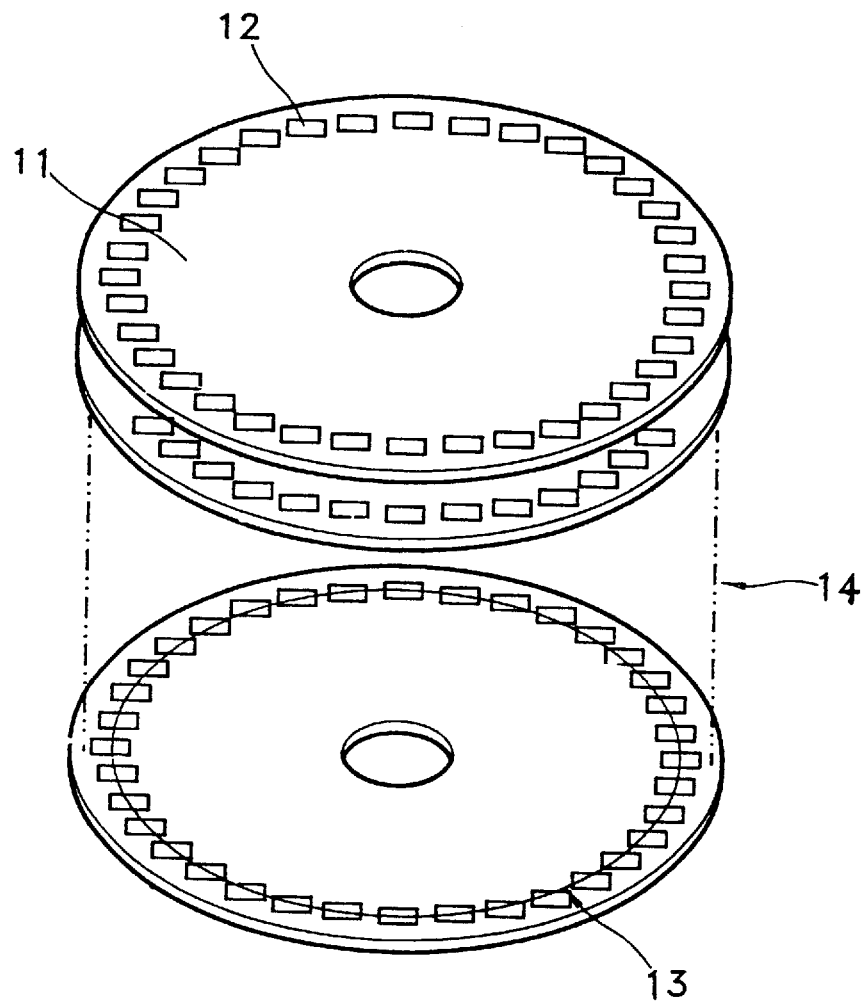
FIG. 1 is a perspective view illustrating a typical disk structure for use in a hard disk drive.

Referring now to the drawings and particularly to FIG. 1, which illustrates a structure of a disk for use in a hard disk drive. As shown in FIG. 1, a typical disk 11 includes a plurality of sectors 12 which are units for storing and reading data arranged in a succession of circular tracks 13. A cylinder 14 represents a cylindrical representation of those circular tracks 13.

When a read/write command is issued by a microprocessor of a host computer, a hard disk drive having a pair of disks 11 installed therein converts logical addresses of the cylinder, the transducer head and sector in the disk drive into their respective physical addresses, and proceeds to read from and write thereto the sectors of the required numbers by moving the transducer head to the corresponding position on the disk.

Figure 2A:
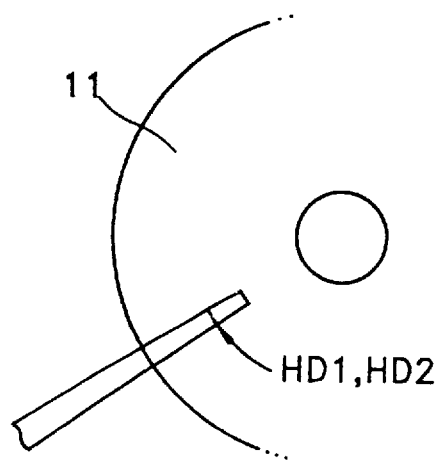
FIGS. 2A and 2B are schematic views respectively illustrating the characteristics of a transducer head arrangement in the hard disk drive.
Figure 2B:
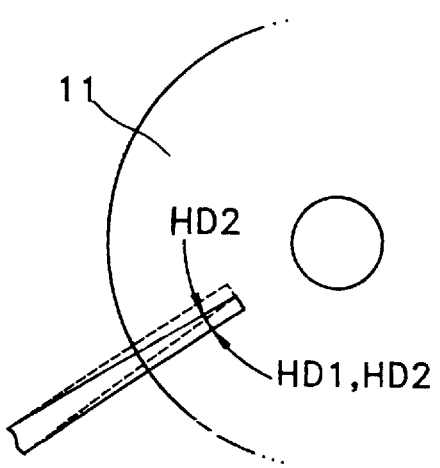

As described earlier, when the disk drives are miniatured and high density disks are obtained, assembly errors often arise during the high volume manufacturing of a disk drive. As shown in FIGS. 2A and 2B, for example, when a pair of transducer heads HD1 and HD2 are arranged in a row on a co-axial cylinder of the disk drive, a slight change in such an arrangement will detrimentally affect the reliability or function of the entire disk drive. This prolongs a setting time for a stable head positioning of a target transducer head since a phase error signal (PES) increases after the head switching.

Figure 3:
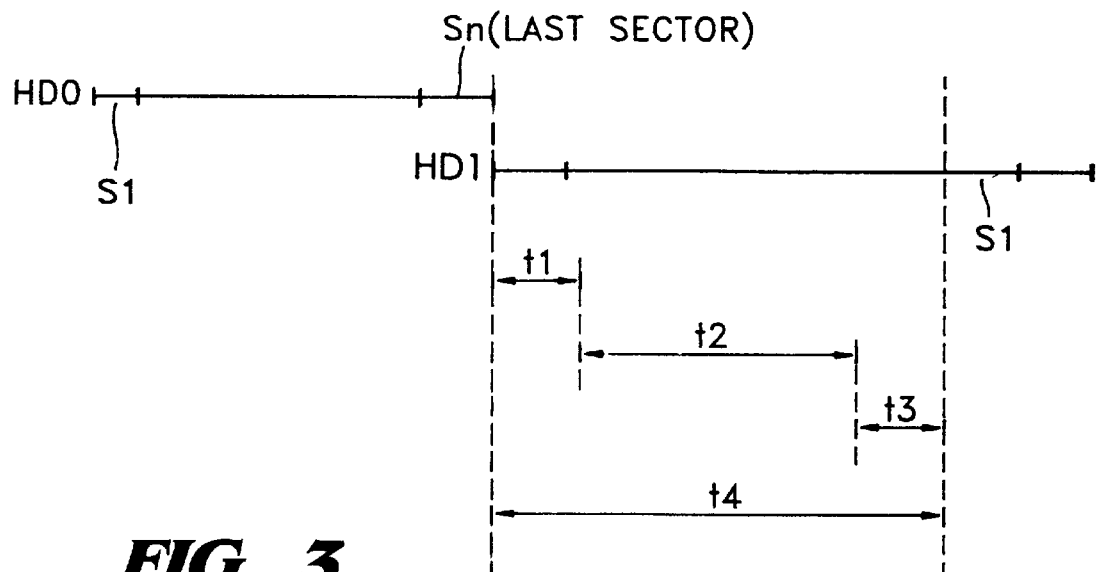
FIG. 3 is a timing diagram for explaining a track skew in the hard disk drive.

Generally, in the head switching action of the hard disk drive, after the transducer head is switched according to servo information while the transducer head is positioned on a disk surface, whether the position difference of the transducer head is stable is determined. Then, reading and writing is performed after verifying a corresponding sector ID. At this time, the head position is changed to a first sector portion of a disk from a physical index position to perform reading and writing after the stable head setting, which is referred to as a track skew. The time for the head switching to reading and writing from or to a corresponding sector is referred to as a track skew time. Assuming that there is a pair of transducer heads in a hard disk drive as shown in FIG. 2, FIG. 3 illustrates, for example, the time from reading and writing with respect to a last sector (Sn) of a first transducer head (HD0) to continuous reading and writing with respect to a first sector (Sn) of a next transducer head (HD1) is referred to as a track skew time t4 which includes a head switching time t1, a head settling time t2 and a controller ready time t3 for reading and writing data on the disk.

Figure 4:
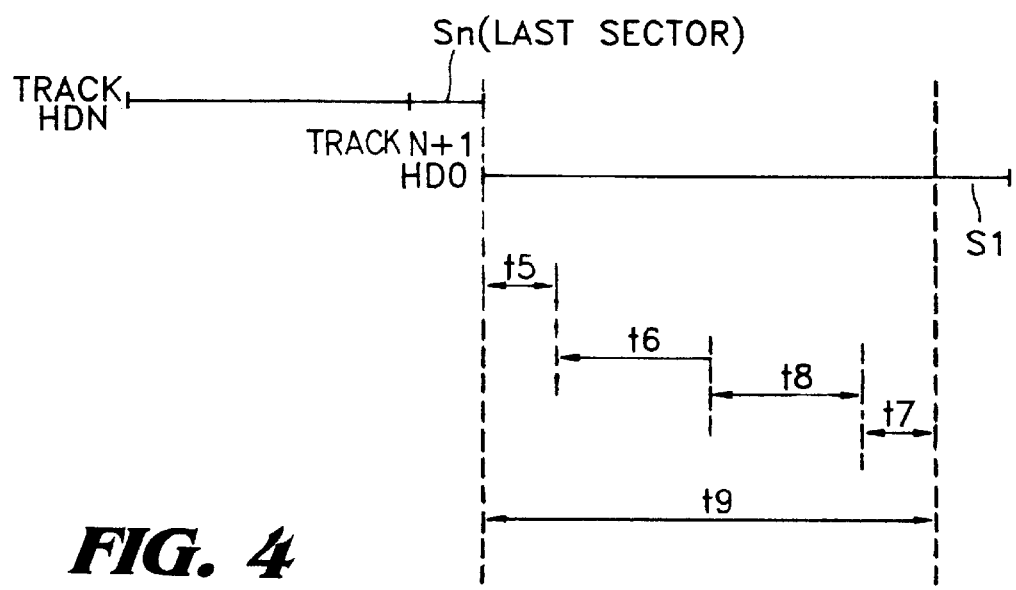
FIG. 4 is a timing diagram for explaining a cylinder skew in the hard disk drive.

FIG. 4 illustrates, for example, the head switching of reading and writing from the last sector (Sn) and a last transducer head (HDN) of a N-th track to the first sector (S1) and a first transducer head (HD0) of a (N+1)th track is referred to as a cylinder skew, and the necessary time for such a head switching is a cylinder skew time t9 which includes a head switching time t5, a head settling time t6, a 1-track seek time t8 and a controller ready time t7 for reading and writing data on the disk. These skew parameters, as described earlier, exhibit different values from each other according to a zone structure for a constant density recording. In such a conventional hard disk drive, however, we have observed that a uniform skew value is applied to all disk drives by generally calculating the head switching time, the head settling time, the controller ready time and the 1-track seek time without considering the characteristics of each individual hard disk drive. That is, even though the skew value can be adjusted in accordance with individual components such as a transducer head, a spindle motor, a voice coil motor and a servo system etc. all of which define the characteristics of each hard disk drive, a uniform value with a predetermined allowance, rather than an optimal value for each disk drive, is set as a skew value. As a result, the settling time of the transducer head is prolonged when the transducer head arrangement is slightly changed or deformed and the skew time becomes undesirably lengthened. That is, since the first sector position is determined by the calculated skew time, the direct reading and writing of the first sector is not available at least until after one rotation of a disk. In other words, a single rotation of the disk is required before the first sector position can be determined. This inevitably results in a time delay which lowers the performance of each individual disk drive as well as the entire hard disk drive. Moreover, it is burdensome to repeat a rather complicated process of checking the disk drive characteristics and reset another skew value suitable for each design change of the disk drive.

Figure 5:
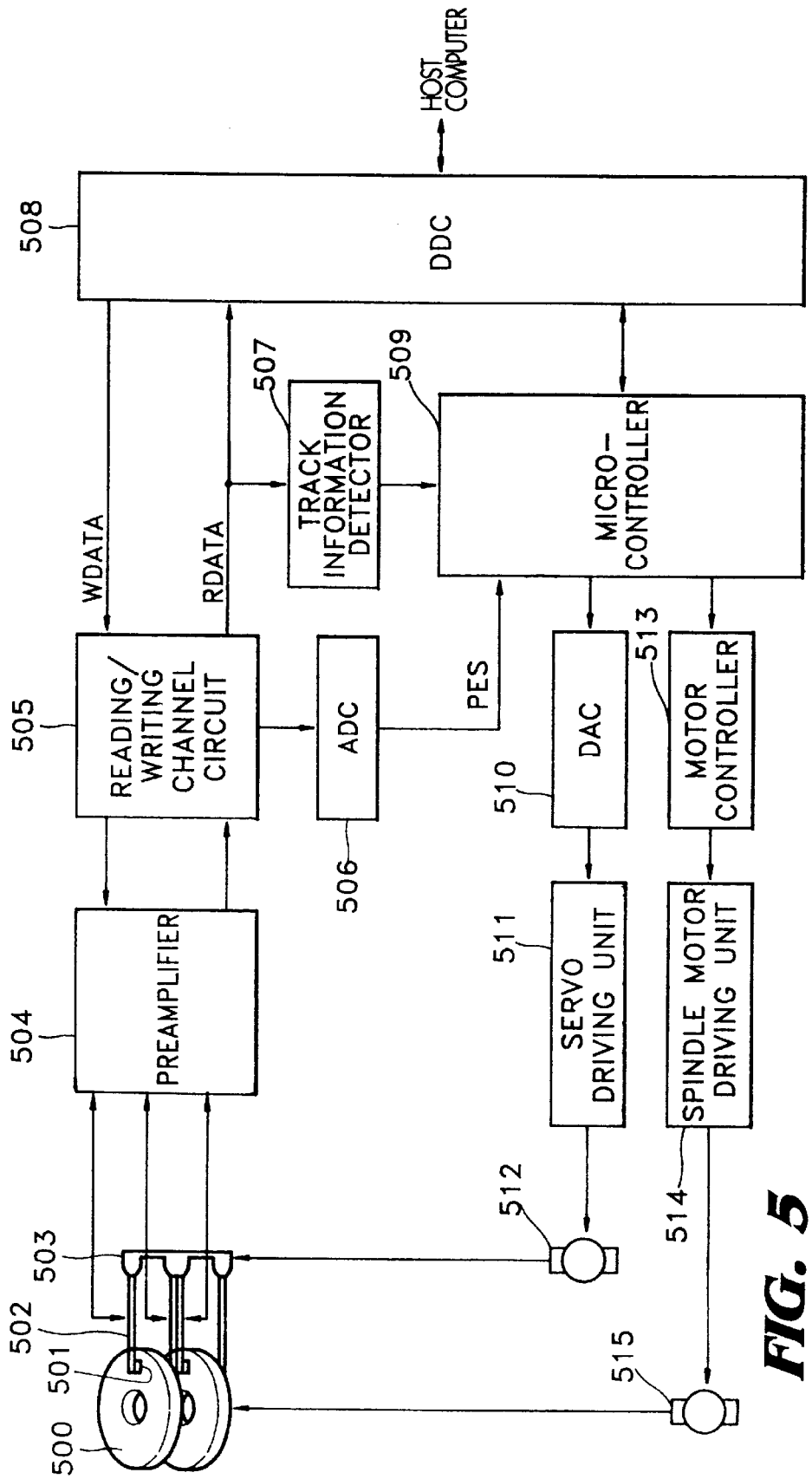
FIG. 5 illustrates a system configuration of a hard disk drive constructed according to the principles of the present invention.

Turning now to FIG. 5 which illustrates a system configuration of a hard disk drive constructed according to the principles of the present invention. The hard disk drive includes a pair of magnetic disks 500, a transducer head assembly 503 in an E-shape having actuator arms 502 each for supporting a respective pair of magnetic heads 501, a preamplifier 504, a reading/writing channel circuit 505, an analog-to-digital converter (ADC) 506, a track information detector 507, a disk data controller (DDC) 508, a microcontroller 509, a digital-to-analog converter (DAC) 510, a servo driving circuit 511, a motor controller 513, a spindle motor driving circuit 514 and actuators 512, 515 for moving the magnetic heads 501 across the surface of the disks 500.

Preamplifier 504 is electrically connected to the transducer head assembly 503 for amplifying a predetermined signal read out from the disk 500 using the magnetic head 501 and transmitting the amplified signal to the reading/writing channel circuit 505. For the purpose of writing data onto the disk 500, the preamplifier 504 applies encoded writing data transmitted from the reading/writing channel circuit 505 to a designated transducer head from the four magnetic heads 501 to be recorded on the disk 500. At this time, the preamplifier 504 selects one of the magnetic heads 501 according to a control signal generated from a disk data controller (DDC) 508 under the instruction of a microcontroller 509.

Reading/writing channel circuit 505 is connected between the preamplifier 504 and the DDC 508 for decoding data pulses from an input signal received from the preamplifier 504 to generate read-out data RDATA, and for decoding writing data WDATA received from the DDC 508 to transmit the decoded WDATA to the preamplifier 504. The reading/writing channel circuit 505 generates a phase error signal (PES) by decoding head position information, i.e., a part of servo information, which is recorded on the disk. The PES is then transmitted to the micro controller 509 via an analog-to-digital converter (ADC) 506. At this stage, the ADC 506 converts the PES into a digital value corresponding to a predetermined level and transmits the converted PES to the micro-controller 509.

Track information detector 507 is connected between the reading/writing channel circuit 505 and the micro-controller 509 for detecting from the RDATA, a track number for the current position of the magnetic head 501 and providing the detected data to the micro-controller 509. The DDC 508 is controlled by the micro-controller 509 to record the data received from a host computer via the reading/writing channel circuit 505 and the preamplifier 504 or to transmit the data read out from the disk 500 to the host computer.

Micro-controller 509 controls the DDC 508 according to a command received from the host computer to search a track and position of the transducer head. In doing so, the micro controller 509 uses the track number and the PES input from the track information detector 507 and the ADC 506, respectively. The digital-to-analog converter (DAC) 510 is connected to the micro-controller 509 for converting the digital signal output from the micro-controller 509 into an analog signal for controlling the position of the magnetic heads 501. A servo driving unit 511 generates a driving current for driving an actuator 512 according to the analog signal input from the DAC 510. The actuator 512 drives the magnetic heads 501 to move in a radial direction of the disk 500 corresponding to the level of the driving current input from the servo driving unit 511.

Motor controller 513 is connected to the micro-controller 509 for controlling a spindle motor driving unit 514 according to a disk rotation control command output from the micro controller 509. The spindle motor driving unit 514 drives a spindle motor 515 in accordance with the control of the motor controller 513 to thereby rotate the disk 500.

The skew optimizing method for a hard disk drive as shown in FIG. 5 according to the present invention will now be described with references to FIGS. 6, 7A, 7B and 8.

Figure 6:
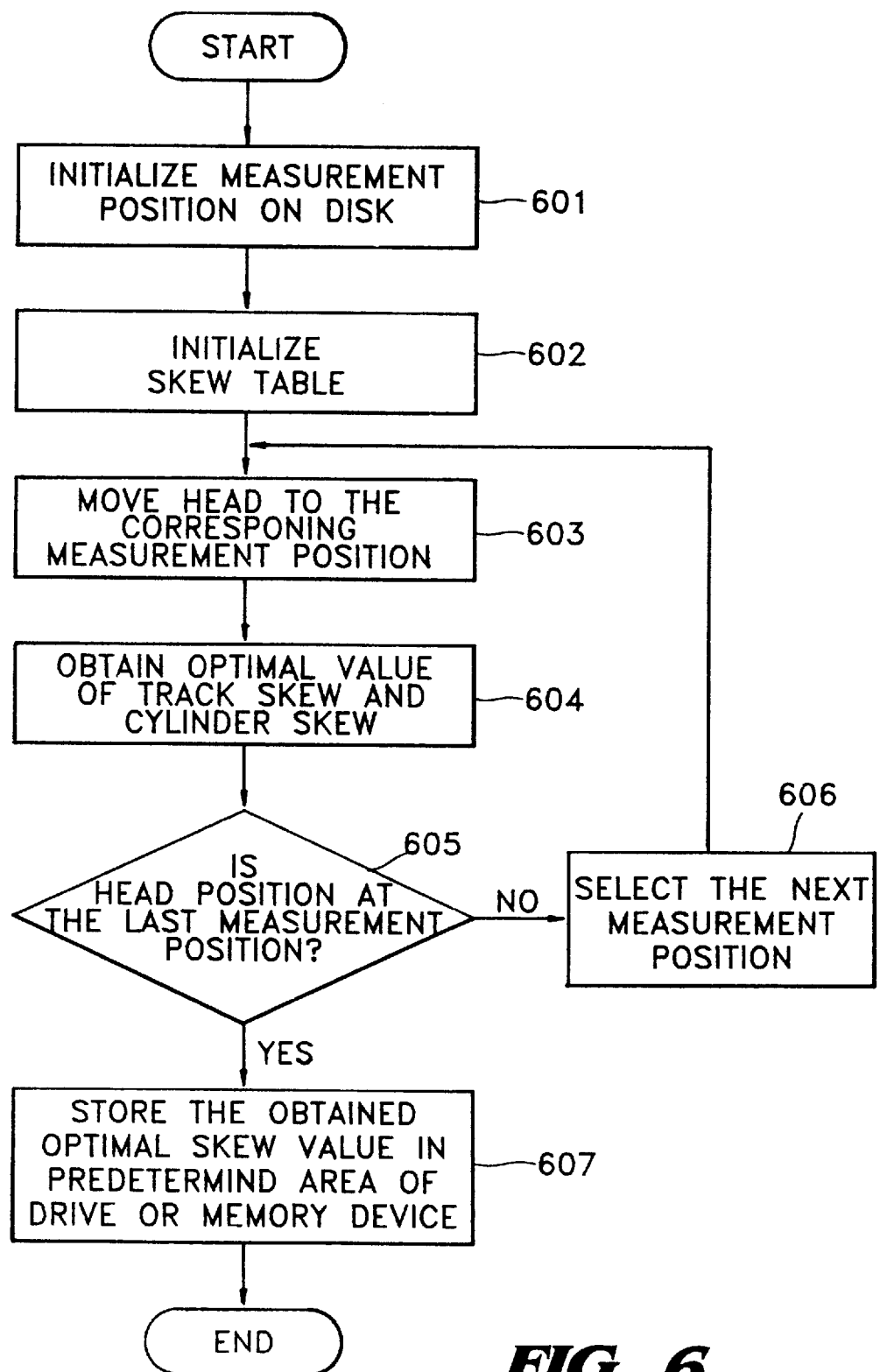
FIG. 6 is a flow chart for illustrating a skew optimizing method for a hard disk drive according to a preferred embodiment of the present invention.

Referring to FIG. 6 which illustrates a skew optimizing method for a hard disk drive of FIG. 5 according to a first embodiment of the present invention. First, a predetermined measurement position on the disk 500 such as a zone number or a head number, is initialized to obtain a skew value at step 601. Then, a skew table is initialized at step 602. The transducer head 5001 is moved to the corresponding measurement position at step 603, and the optimal values of the track skew and the cylinder skew are obtained at step 604. In step 605, it is determined whether the position of the transducer head 501 is at the last measurement position. If it is determined that the current head position is not the last measurement position at step 605, the next measurement position is selected at step 606, and thus, the process of obtaining the optimal skew value is repeated till the last measurement position is determined. If it is determined that the current head position the last measurement position at step 605, however, the obtained optimal skew value is stored in a predetermined area of the drive or a memory device at step 607. Thus, a head skew optimizing process according to the first embodiment of the present invention is completed.

Figure 7A:
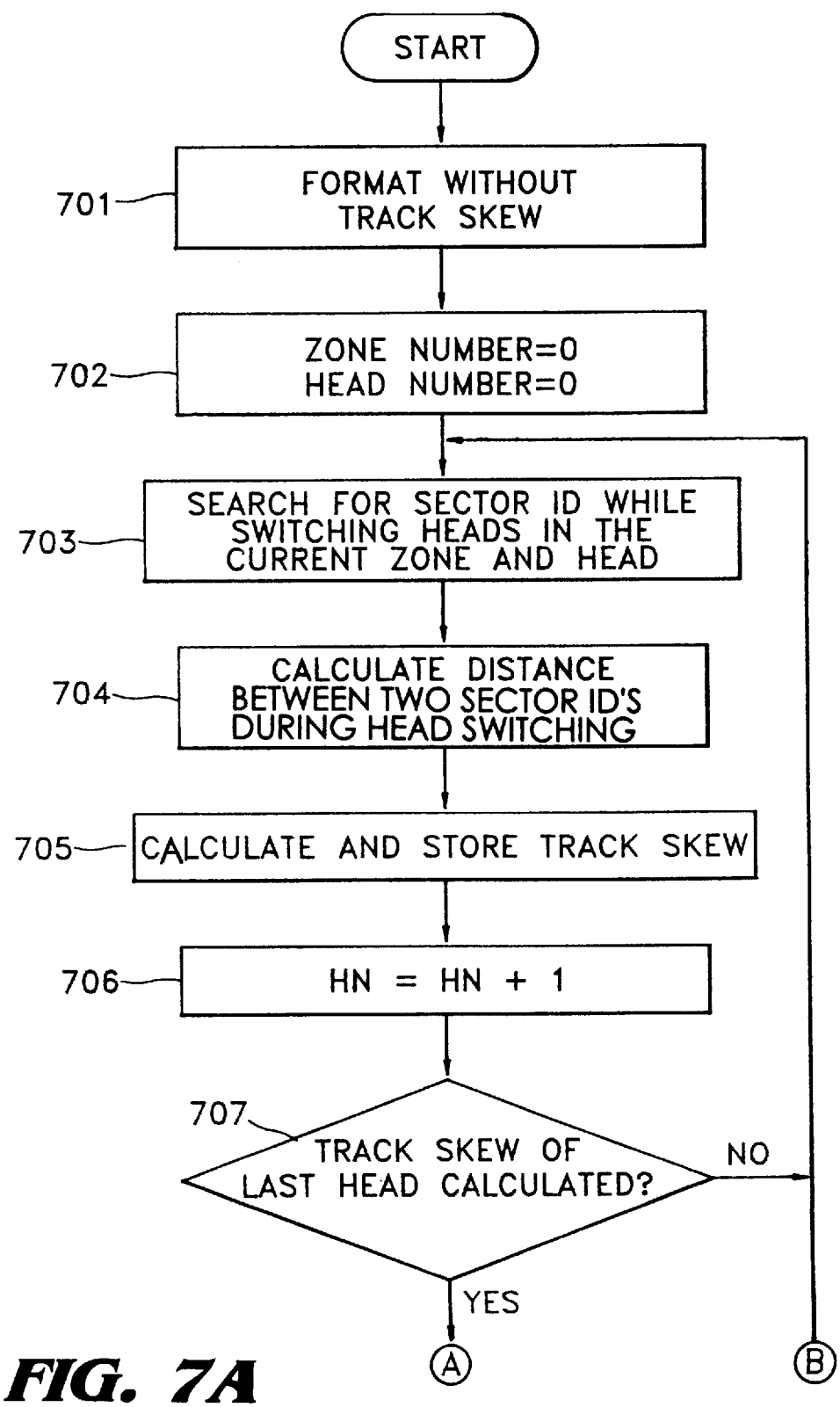
FIGS. 7A and 7B are flow charts for illustrating a skew optimizing method for a hard disk drive according to another preferred embodiment of the present invention.
Figure 7B:
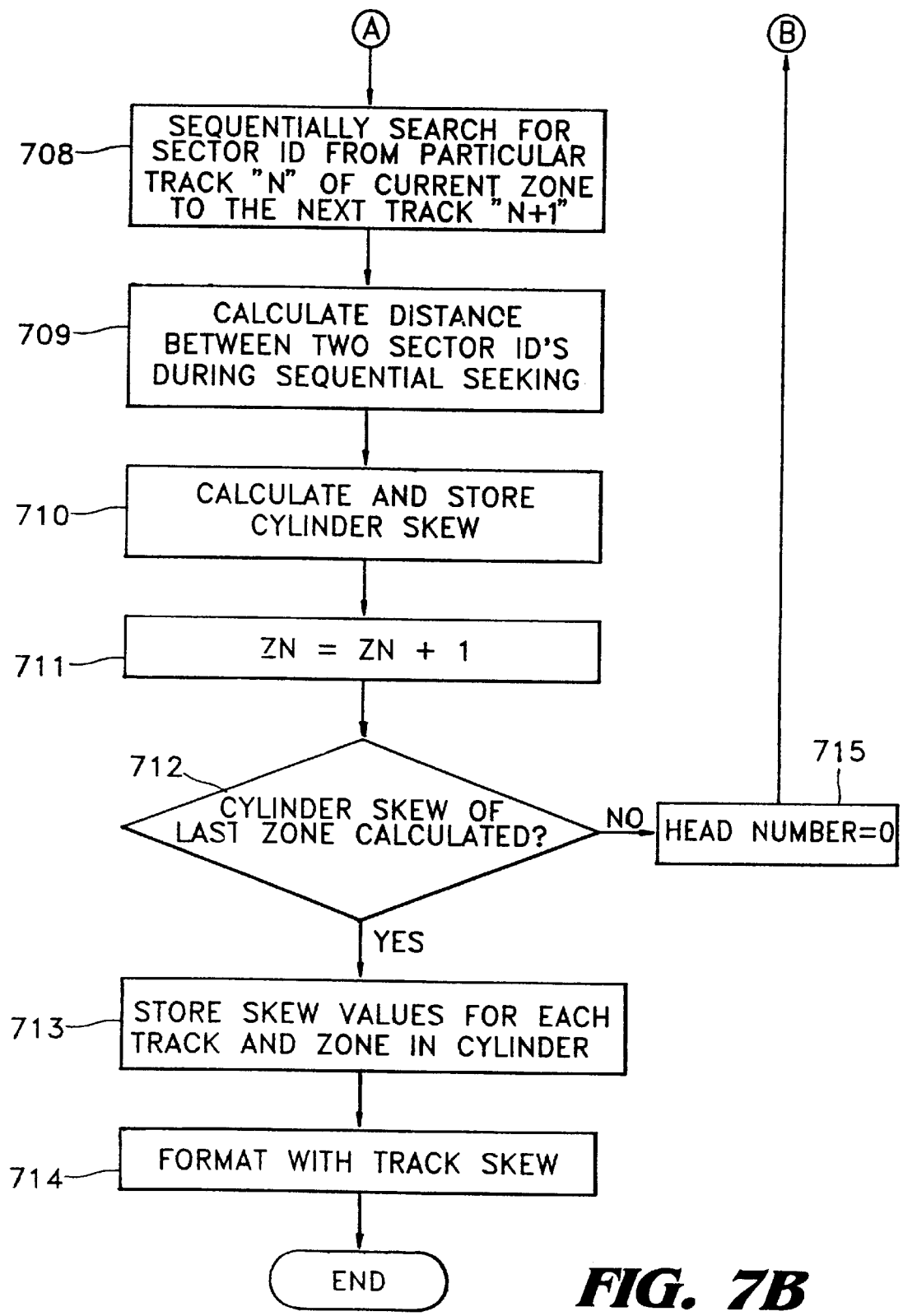

Referring now to FIGS. 7A and 7B, which illustrate a skew optimizing method for a hard disk drive of FIG. 5 according to a second embodiment of the present invention. First, the micro-controller 509 formats a track using an index as a standard without track skew at step 701. Once the track is formatted at step 701, a zone number and a head number are respectively initialized to zero ("0") at step 702. Then, a sector ID is searched for while the transducer head 501 is switched at the current zone and the current head at step 703. That is, the head number is assigned such that an index search action is performed to include the last sector of the zone positioned at a head number 0 and the first sector positioned at a head number 1 starting from a track skew position of the first zone (an arbitrary position in the first, the middle and the last positions of the zone). Then, a sector number for the first index search of the head number 1 is obtained. After the sector number for the first index search of the head number 1 is obtained, the distance between two sector ID's is calculated during the head switching at step 704. At this time, such action is repeated until reliable data can be obtained and stored in a predetermined area of the disk drive or a memory device. Next, the minimum, mean and maximum values of the stored data are obtained and the last track skew value is calculated and stored by adding a value, related to temperature and moisture, to the minimum, mean and maximum values at step 705. Such a process increases the head number from 0 to 3(HN=HN+1) in the case of a disk drive having four transducer heads as shown in step 706.

Next, it is determined whether the track skew with respect to a last transducer head is calculated at step 707. When it is determined that the track skew of the last transducer head is not calculated at step 707, the program returns to step 703 to obtain the track skew value for all the transducer heads. When it is determined that the track skew of the last transducer head is calculated, however, the sector ID is sequentially searched from a particular track N of the current zone to the next track N+1 at step 708. The distance between two sector ID's during the sequential seeking is calculated at step 709. The last cylinder skew value is then calculated and stored at step 710. At this time, the number of the zone increases by one (ZN=ZN+1) at step 711. Next, it is then determined whether the cylinder skew with respect to the last zone is calculated at step 712. When it is determined that the cylinder skew of the last zone is not calculated at step 712, the head number is initialized to zero ("0") at step 715, and the program returns to step 703 to obtain the track skew and the cylinder skew values for each zone. When it is determined that the cylinder skew of the last zone is calculated at step 712, however, the skew values for each zone and track are stored in a cylinder used for information storage at step 713, and the format is performed with the track skew, at step 714. Thus, a head skew optimizing process of the second embodiment of the present invention is completed.

Figure 8:
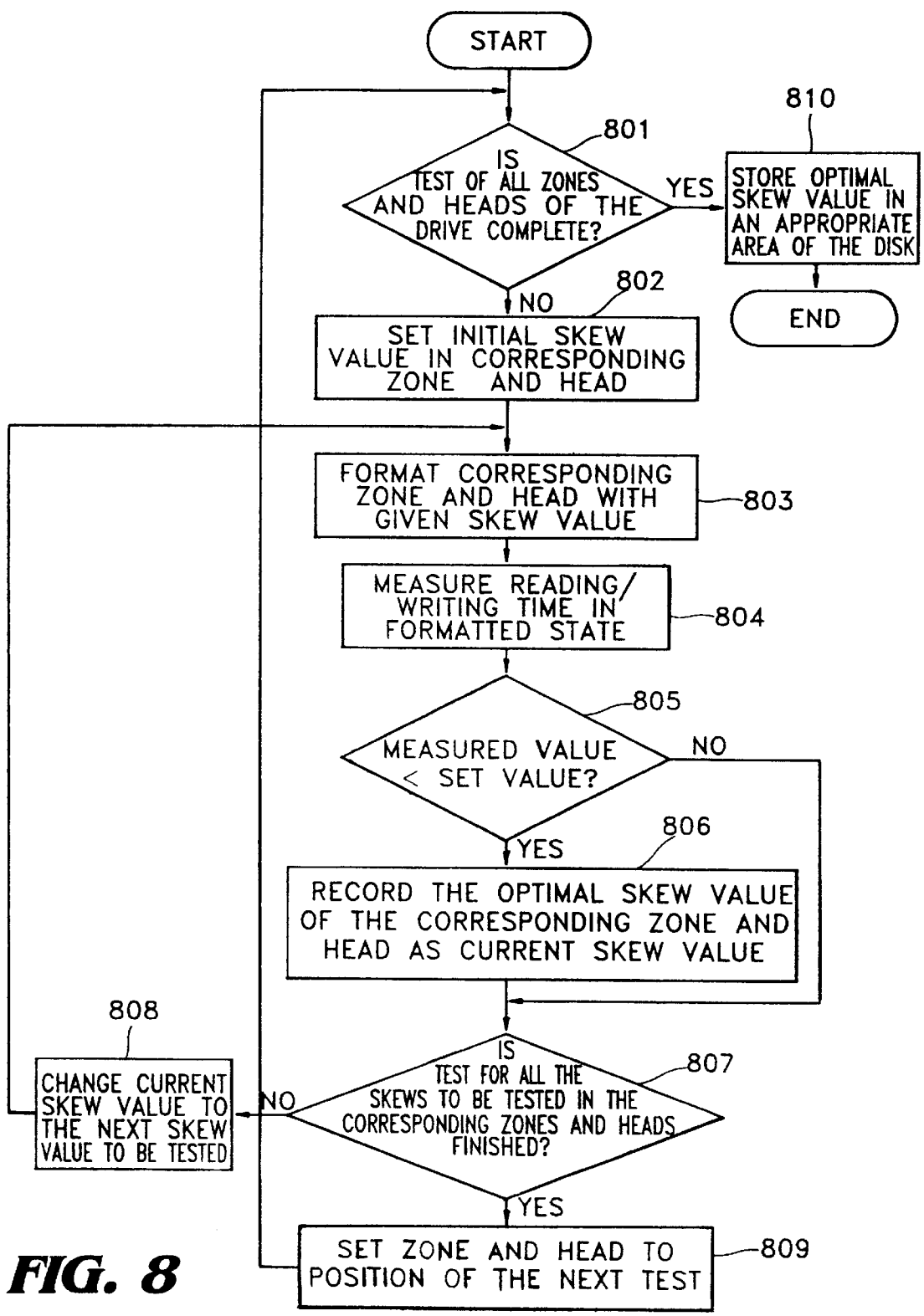
FIG. 8 is a flow chart for illustrating a skew optimizing method of the hard disk drive according to yet another preferred embodiment of the present invention.

Referring now to FIG. 8 which illustrates a skew optimizing method for a hard disk drive of FIG. 5 according to a third embodiment of the present invention. In this embodiment, a self-test process such as a burn-in process during the manufacturing of a hard disk drive is required. As shown in FIG. 8, it is first determined by the DDC 508 whether all the zones and transducer heads of the disk drive are subject to a test at step 801. If the test for all the zones and transducer heads of the drive is not completed at step 801, the initial skew value in the corresponding zone and transducer head are set at step 802. At this time, the initial skew value is on the order of a few of milliseconds or microseconds and set to the largest value of a predetermined range for the test. That is, to obtain the optimal skew value, various skew values for each zone and transducer head are used in the test. Accordingly, the initial skew value for the test is set to the largest value. When the initial skew value is set in the manner as described above, the format is performed in the corresponding zone and transducer head according to the set skew value at step 803. That is, the DDC 508 selects a particular track from the zone and positions a transducer head on the disk to be subjected to the test in accordance with the set initial skew value and records the sector number on a part of the disk at a position corresponding to the set initial skew value from the start position of the sector. When the format is completed at step 803, a required time is measured by performing a reading and writing test while in the above state at step 804. In step 805, it is determined whether the measured value is less than a value set to the initial skew value. When the measured value is not less than the set value, the program proceeds to determining whether the test with respect to all the skews to be tested in the corresponding zone and transducer head is completed at step 807. When the measured value is less than the set value, however, the current skew value is recorded on a predetermined area of the disk as an optimal skew value of the corresponding zone and transducer head at step 806. Next, it is determined whether the test for all the skews of the corresponding zone and transducer head is finished at step 807. If the test for all the skews is not finished in step 807, the program returns to step 803 after the current skew value being tested is changed to the next skew value at step 808. When the test for all the skews is finished, the program returns to step 801 after the zone and transducer head are set to the position of the next test at step 809. When the test of all the zones and transducer heads of the drive is completed by repeating the process from step 801 to step 809, the skew value requiring the minimum necessary time in each of the zones and transducer heads is set as an optimal skew value and stored in an appropriate area of the disk at step 810. Thus, a head skew optimizing process is finally completed.

As described above, in the skew optimizing method for a hard disk drive according to the present invention, the skew value of the disk drive is not uniformly set as required by the conventional disk drive technology. Instead, the skew value of the disk drive according to the present invention is set separately for each drive with an optimal skew value. Thus, the time for reading and writing information from and to the disk can be sharply reduced so that the performance of the drive can be markedly improved.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A skew optimizing method for a hard disk drive, comprising the steps of:

initializing a measurement position on a disk to obtain a skew value;

initializing a skew table;

moving a transducer heading a skew table;

obtaining an optimal value of track skew and cylinder skew;

checking whether a current head position is a last measurement position;

when the current head position is not the last measurement position, selecting the next measurement position and returning to moving said transducer head to the next corresponding measurement position; and alternatively, when the current head position is the last measurement position, storing an obtained optimal skew value in a predetermined area of one of said hard disk drive and a memory device.

2. A skew optimizing method for a hard disk drive, comprising the steps of:

(a) initializing a zone number and a head number by formatting a disk without a track skew;

(b) searching for a sector identification while switching transducer heads at current zone and transducer head;

(c) calculating the distance between two successive sector identifications during the transducer head switching;

(d) calculating and storing a track skew based on the data searched for at step (b) and increasing the head number by a constant value;

(e) determining whether the track skew of a last transducer head is calculated;

(f) when it is determined that the track skew of the last transducer head is not calculated at step (e), returning to step (b);

(g) when it is determined that the track skew of the last transducer head is calculated at step (e), sequentially searching for a sector identification from a particular track of the current zone to a next track;

(h) calculating the distance between the successive sector identification of the particular track and the next track during the sequential searching at step (g);

(i) calculating and storing a cylinder skew based on the data searched for at step (g);

(j) increasing the zone number based on a calculated cylinder skew value and determining whether the cylinder skew of the last zone is calculated;

(k) when it is determined that the cylinder skew of the last zone is not calculated at step (j), initializing the head number and returning to step (b); and (l) when it is determined that the cylinder skew of the last zone is calculated at step (j), storing the skew value for each transducer head and zone in a cylinder used for information storage and formatting with the track skew.

3. A skew optimizing method for a hard disk drive, comprising the steps of:

(a) checking whether a test of all zones and transducer heads of the hard disk drive is completed;

(b) when it is determined that the test of step (a) is not completed, setting an initial skew value of a corresponding zone and transducer head;

(c) formatting the corresponding zone and transducer head based on the set skew value;

(d) measuring a required time to perform reading and writing in a formatted state;

(e) determining whether a measured time value is less than a set time value;

(f) when it is determined that the measured time value is less than the set time value, recording an optimal skew value of the corresponding zone and transducer head and determining whether the test of all skews in the corresponding zone and transducer head is completed;

(g) when it is determined that the measured time value is not less than the set time value, bypassing step (f) and determining whether the test of all the skews in the corresponding zone and transducer head is completed;

(h) when the test of all the skews in the corresponding zone and transducer head is not completed, changing the current skew value to a next skew value to be tested and returning to step (c);

(i) when the test of all the skews in the corresponding zone and transducer head is completed, setting the zone and transducer head to a position of the next test, and returning to step (a); and (j) when it is determined that the test with respect to all the zones and transducer heads are completed in step (a), storing the skew value of a minimum required time in each zone and transducer head as an optimal skew value in a predetermined area of a disk.

4. The skew optimizing method of claim 3, further comprised of a process of step (a) to step (i) is repeatedly performed.

5. The skew optimizing method of claim 3, further comprised of said initial skew value being set to a largest value among the skew values in a predetermined range.

6. A skew optimizing method for a hard disk drive, comprising the steps of:

initializing a zone number and a head number of a disk;

searching for a sector identification while a transducer head is switched at a current zone;

calculating the distance between two successive sector identifications during the transducer head switching;

obtaining and storing a track skew, and increasing the head number by a constant value;

determining whether the track skew of a last transducer head is calculated;

when the track skew of the last transducer head is not calculated, returning to search for the sector identification;

when the track skew of the last transducer head is calculated, sequentially searching for a sector identification from a particular track of the current zone to a next track;

calculating the distance between the successive sector identification of the particular track and the next track;

obtaining and storing a cylinder skew;

increasing the zone number based on a calculated cylinder skew value and determining whether the cylinder skew of the last zone is calculated;

when the cylinder skew of the last zone is not calculated, initializing the head number and returning to searching for the sector identification; and when the cylinder skew of the last zone is calculated, storing the skew value for each transducer head and zone in a cylinder used for information storage and formatting with the track skew.

* * * * *